United States Patent [19]

Nishio

[11] Patent Number: 4,862,270
[45] Date of Patent: Aug. 29, 1989

[54] CIRCUIT FOR PROCESSING A DIGITAL SIGNAL HAVING A BLANKING INTERVAL

[75] Inventor: Naoki Nishio, Kanagawa, Japan

[73] Assignee: Sony Corp., Tokyo, Japan

[21] Appl. No.: 249,293

[22] Filed: Sep. 26, 1988

[30] Foreign Application Priority Data

Sep. 29, 1987 [JP] Japan .............................. 62-148529[U]

[51] Int. Cl.⁴ ..................... H04N 5/087; H04N 5/202; H04N 5/208; H04N 5/225
[52] U.S. Cl. .................................... 358/160; 358/147; 358/162; 358/164
[58] Field of Search ................. 358/32, 142, 147, 160, 358/162, 164

[56] References Cited

U.S. PATENT DOCUMENTS 4,200,887  4/1980  Van Den Avoort ............... 358/162
4,200,888  4/1980  Blom .................................... 358/162

Primary Examiner—James J. Groody
Assistant Examiner—Michael D. Parker
Attorney, Agent, or Firm—Alvin Sinderbrand

[57] ABSTRACT

A digital signal processing circuit for carrying out a series of processings for a digital signal having a signal effective interval and blanking interval such as a video signal. Operation control data added to the blanking interval of the input digital signal controls the signal processings of a plurality of signal processing blocks, so that the circuit construction can be simplified and complicated signal processings can be achieved.

8 Claims, 9 Drawing Sheets

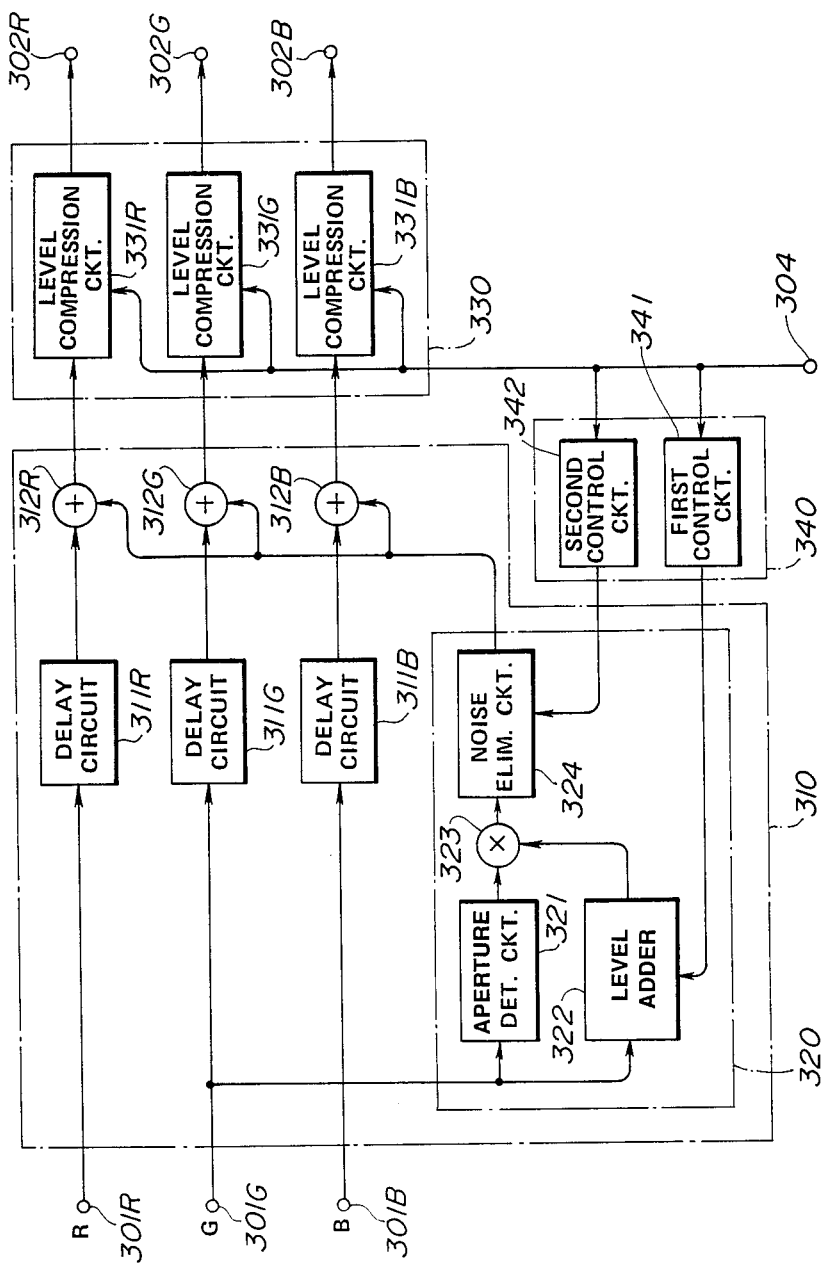

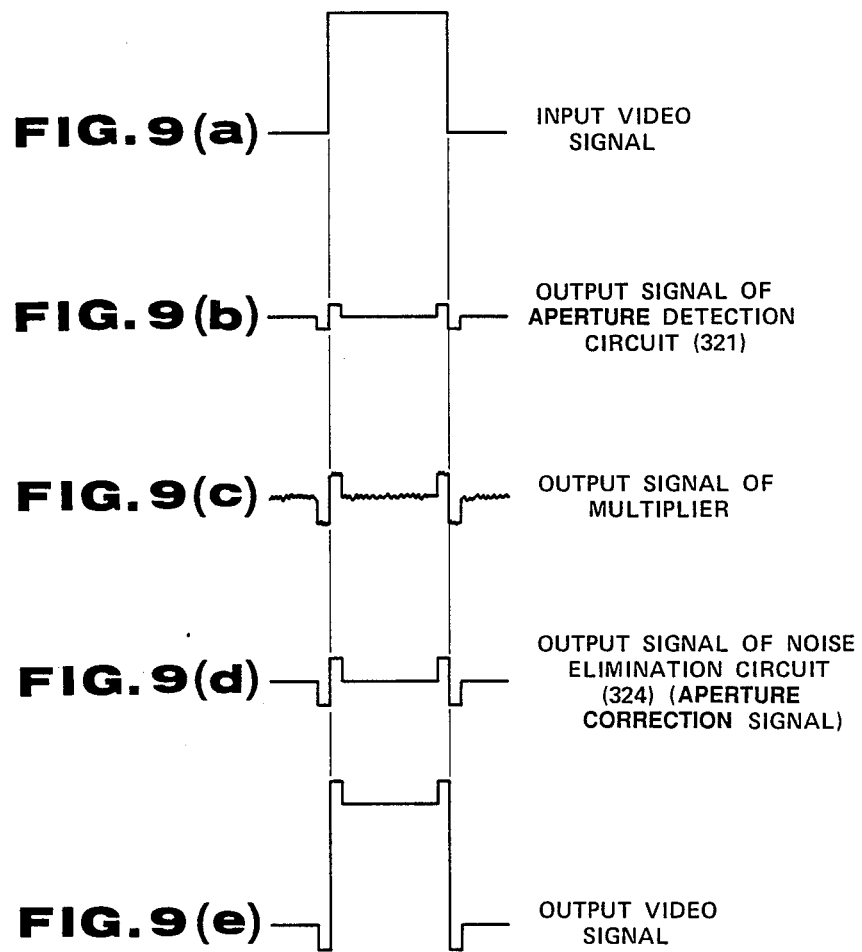
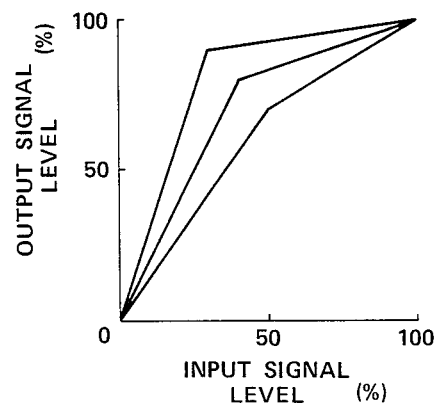

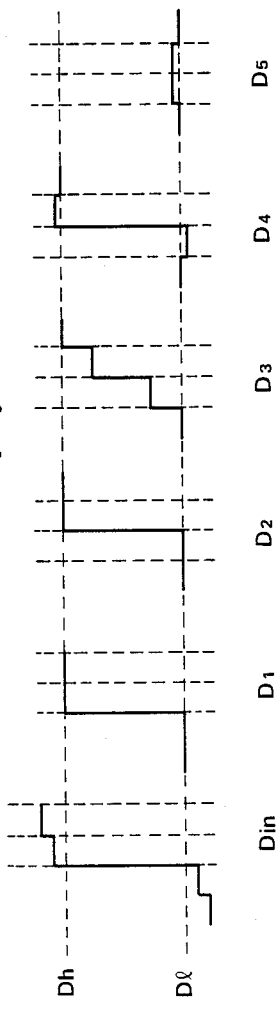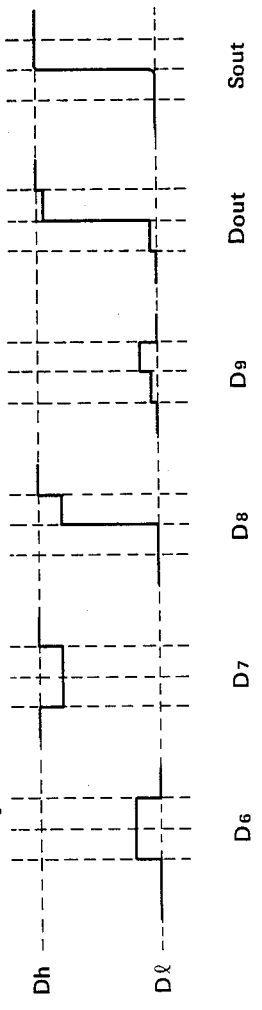

CIRCUIT FOR PROCESSING A DIGITAL SIGNAL HAVING A BLANKING INTERVAL

BACKGROUND OF THE INVENTION

(1) Field of the Invention

The present invention related to a circuit for processing a digital signal such as a digital video signal having a blanking interval. The present invention relates specifically to a digital processing circuit in which signal processings in a plurality of signal processing blocks are controlled on the basis of operation control data added into the blanking interval of the input digital signal, whereby the circuit construction can be simplified and the complex signal processing can be carried out.

(2) Background of the Art

Photographing equipment such as a video camera generally converts an optical image on a surface of a photographic (image pick-up) element into an electrical video signal and produces a standard NTSC (National Television System Committee) color television signal under various signal processings for the video signal such as a white balance adjustment and gamma correction, etc.

In addition, in such a photographic equipment, the NTSC standard color television signal is provided with a blanking interval, i.e., a line returning interval of scanning lines during which no video image is reproduced. The blanking intervals are time intervals between the video signal effective intervals, i.e., between the effective signal segments containing video information.

Recently, along with developments of digital signal processing techniques, a digital signal processing circuit has been used in a signal processing system for video signals.

For example, as shown in FIG. 1, such a digital signal processing circuit includes a data input terminal 101 to which an input digital signal is supplied, a plurality of signal processing blocks 102, 103, and 104 for carrying out predetermined signal processings such as a white balance adjustment and gamma correction for the input digital signal $D_{in}$, and a data output terminal 105, each circuit block and terminal being connected in series with each other.

Furthermore, a control circuit block 106 for controlling the signal processing of each of the signal processing blocks 102, 103, and 104 is connected to each signal processing block 102, 103, and 104 via respective control signal lines 107, 108, and 109.

In the above-described signal processing circuit, each signal processing block 102, 103, and 104 is formed of an IC (Integrated Circuit). Their operation controls are directly carried out by means of the above-described control block 106 via each control signal line 107, 108, and 109 so that the predetermined signal processings for the input digital signal $D_{in}$ are carried out at the respective signal processing blocks 102, 103, and 104 to output the output digital processed signal $D_{out}$ via the data output terminal 105.

The number of signal lines connected to the respective signal processing blocks 102, 103, 104 formed as above-described from ICs, in the video signal processing circuit, amount to approximately more than 100, including the signal lines for outputting and inputting data of color components such as red (R), green (G), and blue(B) of the image pick-up signals, the control signal lines 107, 108 and 109, power supply lines and clock signal lines.

A digital signal processing circuit formed from integrations of several large-scale ICs also has the problems of an excessive number of signal lines and of very complex circuit construction.

Therefore, a digital signal processing circuit is demanded which can carry out the more complex signal processings for the input digital signal. The signal processing blocks for such circuit must be capable of inputting and outputting large amounts of data including that for operation controls. One of methods for inputting and outputting tremendous amounts of data without increase in the number of signal lines connected to the signal processing blocks includes, e.g., the data serial transmission method. However, time errors are generated for the signal processings of the video signals, and, accordingly, a hardware for the reception and transmission of data is needed.

Consequently, there has been no sufficient method of solving these problems up to this time.

SUMMARY OF THE INVENTION

It is therefore an object of the present invention to provide an improved digital signal processing circuit which can achieve complicated signal processing with a relatively simple construction.

It is another object of the present invention to provide an improved digital signal processing circuit which can decrease the number of signal lines.

According to one aspect of the present invention, there is provided a digital signal processing circuit having a plurality of signal processing circuit blocks and a control block which controls the operations of the signal processing blocks. The apparatus comprises combining means for combining the operation control data into a blanking interval of an input digital signal, a control block, and cascade-connected signal processing blocks in which the input digital signal is processed in accordance with the operation control date read from the input digital signal during the blanking interval.

In the digital signal processing circuit according to the present invention, signal lines for inputting or outputting the input digital signals are utilized for inputting or outputting operation control data between the signal processing blocks and the control block.

BRIEF DESCRIPTION OF THE PREFERRED EMBODIMENT

FIG. 8 is a simplified circuit block diagram of still another example of the arithmetic operation circuit shown in FIG. 3.

FIGS. 9(a) to (e) are waveform charts for explaining the operation of the arithmetic circuit shown in FIG. 8.

FIG. 10 is a characteristic graph for explaining the operation of the arithmetic circuit shown in FIG. 8.

Figure 3:
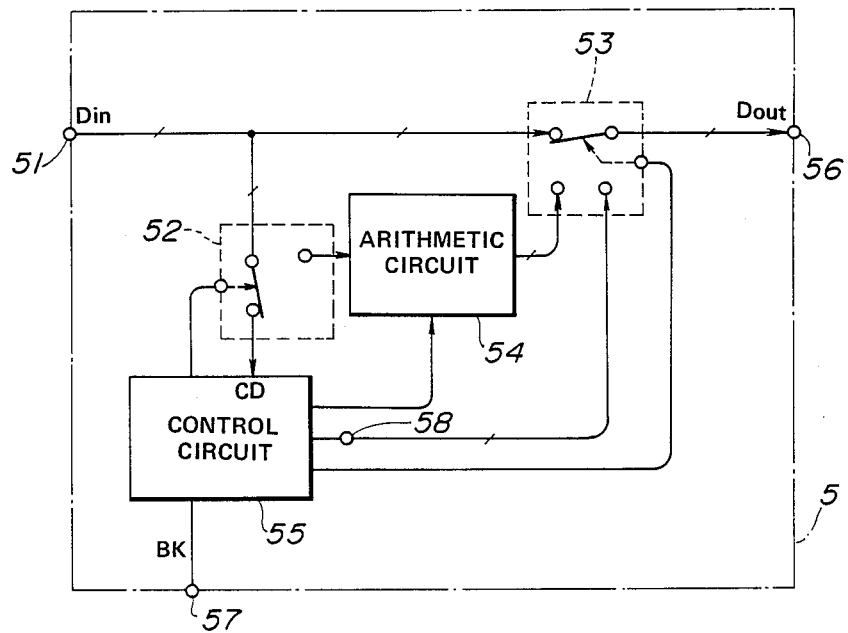
FIG. 3 is a simplified circuit block diagram of a signal processing block in the preferred embodiment shown in FIG. 2.
Figure 11:
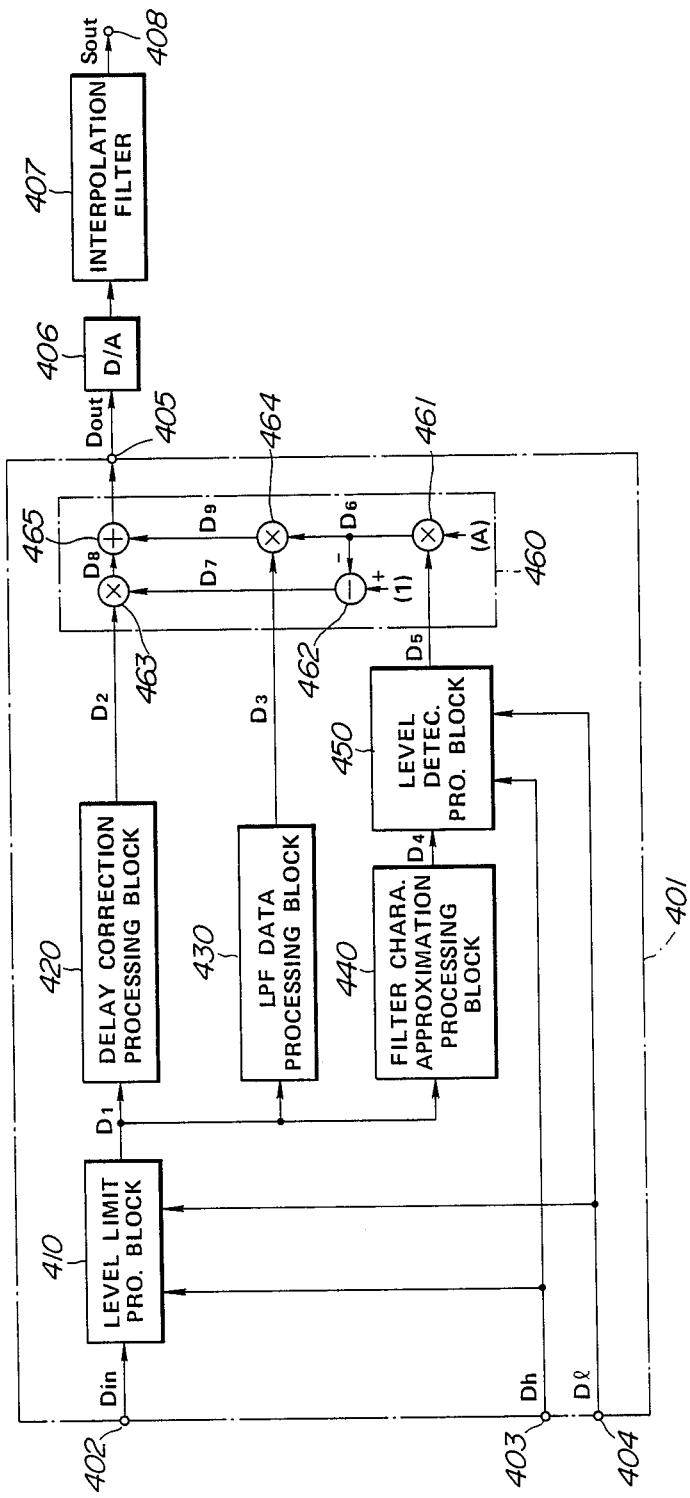

FIG. 11 is a simplified circuit block diagram of a further example of the arithmetic operation circuit shown in FIG. 3.

FIGS. 12(a) to 12(l) are waveform charts for explaining the operation of the circuit shown in FIG. 11.

Figure 13:
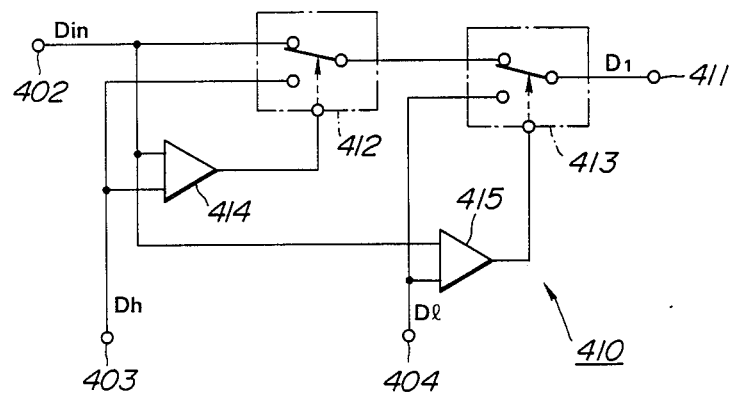

FIG. 13 is a simplified circuit block diagram of a level limit processing block shown in FIG. 11.

Figure 14:
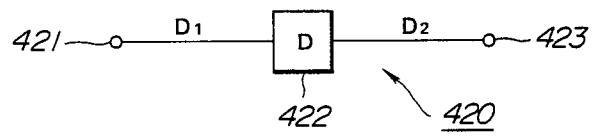

FIG. 14 is a simplified circuit block diagram of a delay correction processing block shown in FIG. 11.

Figure 15:
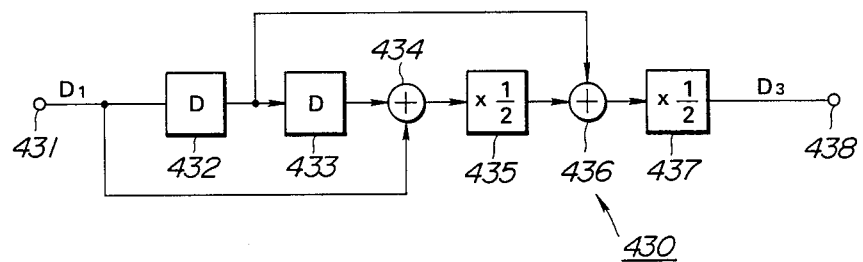

FIG. 15 is a simplified circuit block diagram of an LPF (Low Pass Filter) data processing block shown in FIG. 11.

Figure 16:
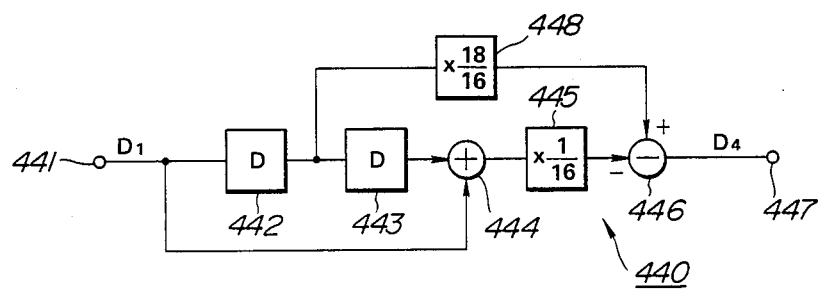

FIG. 16 is a simplified circuit block diagram of a filter characteristic approximation processing block shown in FIG. 11.

Figure 17:
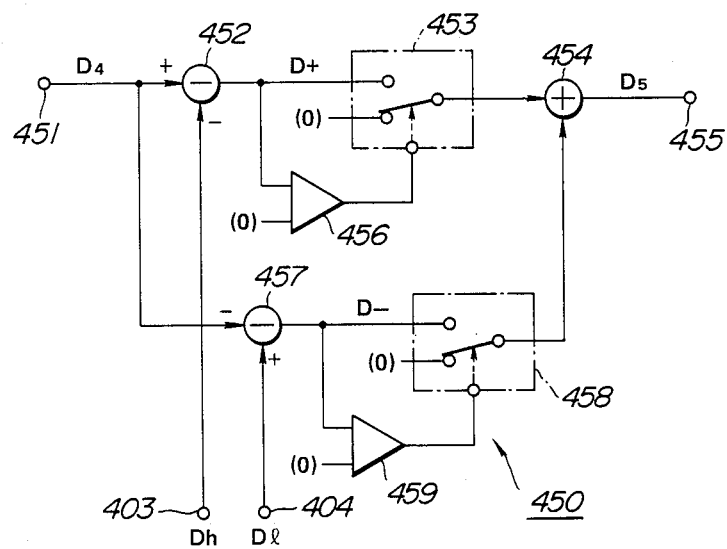

FIG. 17 is a simplified circuit block diagram of a level detection processing block shown in FIG. 11.

DETAILED DESCRIPTION OF THE PREFERRED EMBODIMENT

Reference will hereinafter be made to the drawings in order to facilitate an understanding of the present invention.

Figure 1:
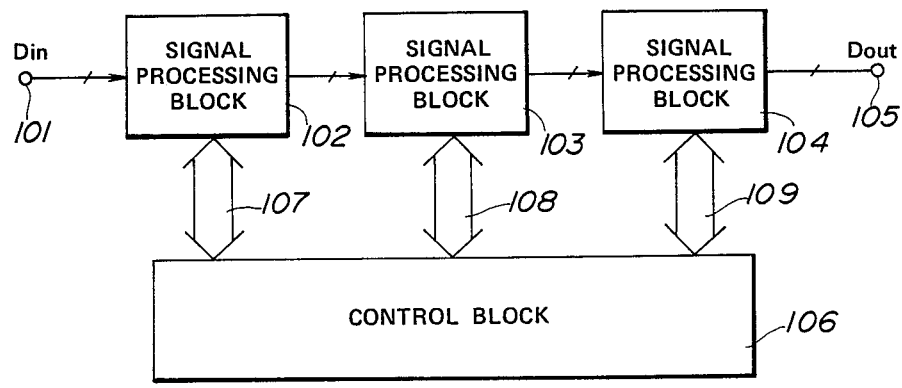
FIG. 1 is a simplified circuit block diagram of a previously proposed digital signal processing circuit.
Figure 2:
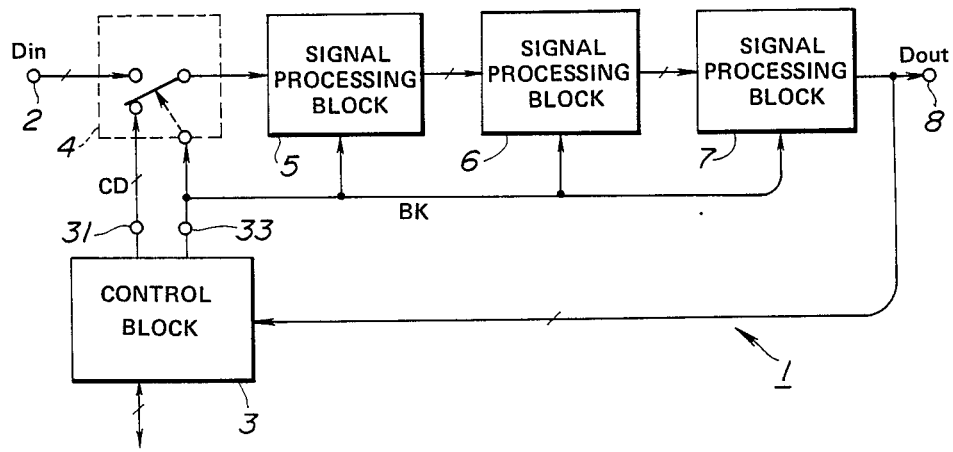
FIG. 2 is a simplified circuit block diagram of another digital signal processing circuit in a preferred embodiment according to the present invention.

FIG. 2 shows a preferred embodiment of a video digital signal processing circuit for processing an image signal (input video signal) derived from a video camera.

As shown in FIG. 2, the digital signal processing circuit 1 includes three series-connected signal processing blocks 5, 6 and 7, disposed between a data input terminal 2 to which an input video signal ($D_{in}$) is supplied and data output terminal 8 from which the processed video signal ($D_{out}$) is outputted, for carrying out predetermined signal processings for the input digital signal ($D_{in}$) such as white balance adjustment, gamma correction, level clip, image enhancement, and so on.

An input data switching circuit 4 is installed between the data input terminal 2 and signal processing block 5 for switching and connecting either the data input terminal 2 or operation control data output terminal 31 of the control block 3 to the signal processing block 5. The input data switching circuit 4 and signal processing blocks 5, 6, and 7 receive a blanking signal (BK), indicating whether the input digital signal ($D_{in}$) is at a blanking interval, via a blanking signal output terminal 33 of the control block 3.

Furthermore, the signal processing block 7 supplies the output digital signal ($D_{out}$) to the above-described data output terminal 8 and to the control block 3. In addition, an external circuit (not shown in FIG. 2) is connected to the control block 3 for transmitting and receiving various data to and from the control block 3.

The input data switching circuit 4 connects the control block 3 to the signal processing block 5 in response to the blanking signal (BK) supplied from the control block 3 when the input digital signal ($D_{in}$) is at the blanking interval. The above-described control block 3 adds operation control data (CD) for the respective signal processing blocks 5, 6, and 7 into the blanking interval of the input digital signal ($D_{in}$).

The operation control data (CD) includes block specification data for specifying any one of the signal processing blocks 5, 6, and 7 and operation specifying data instructing the specified signal processing block to operate. The above-described respective signal processing blocks 5, 6, and 7 read the block specifying data of the operation control data (CD) in response to the blanking signal (BK) supplied from the control block 3. When they are specified by means of the block specifying data, they read the operation instruction data and carry out the predetermined signal processing instructed by means of the operation instruction data for the digital signal ($D_{in}$) to be supplied to the corresponding signal processing block thereafter.

Furthermore, in FIG. 2, the control block 3 determines whether the actual signal processing operation is normally carried out from the output digital signal ($D_{out}$) supplied form the signal processing block 7.

FIG. 3 shows a specific construction of the signal processing block 5 shown in FIG. 2.

In FIG. 3, the signal processing block 5 includes an input data switching circuit 52, an output data switching circuit 53, an arithmetic operation circuit 54, and a control circuit 55. The input data switching circuit 52 is connected to a data input terminal 51 via which the input digital signal ($D_{in}$) is supplied. The output data switching circuit 53 is connected to the data input terminal 51 for supplying the output digital signal ($D_{out}$) to the data output terminal 56. The arithmetic operation circuit 54 carries out the signal processing for the input digital signal ($D_{in}$) supplied via the input data switching circuit 52 and supplies the processed signal to the output digital switching circuit 53. The control circuit 55 controls the operation of the arithmetic operation circuit 54 in accordance with the operation control data (CD) supplied via the input data switching circuit 52.

The above-described control circuit 55 controls each switching operation according to the contents of the blanking signal (BK) supplied from the blanking signal output terminal 33 of the control block 3 via the blanking signal input terminal 57. This control is such that during the video signal interval, the above-described input data switching circuit 52 connects the input data terminal 51 to the arithmetic operation circuit 54, and the output data switching circuit 53 connects the arithmetic operation circuit 54 to the data output terminal 56. The arithmetic operation circuit 54 then carries out the predetermined signal processing for the input digital signal ($D_{in}$) supplied via the input data terminal 51 and outputs the processed signal via the data output terminal 56.

In addition, the above-described control circuit 55 controls, in response to the blanking signal (BK), each switching operation such that during the blanking interval the input data switching circuit 52 connects the data input terminal 51 to the control circuit 55 and the output data switching circuit 53 connects the data input terminal 51 to the data output terminal 56. The input digital signal ($D_{in}$) supplied to the above-described data input terminal 51 is directly outputted via the data output terminal 56.

Furthermore, the control circuit 55 responsive to the blanking signal reads the block specifying data from the operation control data (CD) supplied from the control block 3 during the blanking interval. Then, the control circuit 55 further reads the operation instruction data when specified by the block specification data in the operation control data (CD) and controls the arithmetic operation circuit 54 such that the signal processing specified by the operation specification data is carried out for the input digital signal be subsequently supplied thereto. Hence the signal processing block 5 can carry out a desired signal processing for the input digital signal ($D_{in}$) according to the instruction of the operation control data (CD).

In addition, the control circuit 55 controls the above-described data switching circuit 53 in response to the instruction of the operation instruction data so that an additive data output terminal 58 is connected to the data output terminal 56. During the blanking interval of the input digital signal ($D_{in}$), the data, e.g., indicating the present signal processing situation in the blockscan are outputted to the following stage.

It is noted that the other signal processing blocks 6 and 7 are also constructed substantially in the same way as the above-described signal processing block 5. The operation control data (CD) added into the input digital signal ($D_{in}$) are read during the blanking interval so that the desired signal processing according to the operation control data (CD) is carried out for the input digital signal ($D_{in}$).

Hence, in the digital signal processing circuit 1, the above-described control block 3 can control the signal processings of each signal processing block 5, 6, and 7 through the operation control data (CD) added into the blanking interval of the input digital signal ($D_{in}$). Since the signal line for inputting and outputting the input digital signal ($D_{in}$) can be used to input or output the above-described operation control data (CD), many signal lines can be omitted which were used to input or output the above-described operation control data (CD) and were connected between the previously proposed signal processing blocks. At the same time, a large amount of data can be inputted and outputted at high speeds. Hence, the digital signal processing circuit 1 can be achieved as a high-density and simply constructed digital signal processing circuit and can carry out a more complex signal processing.

It is noted that the present invention is not limited only to the preferred embodiment shown in FIGS. 2 and 3. The individual signal processing blocks may comprise three or more blocks and the operation control data (CD) may be inputted from the above-described data output terminal 8 during the blanking interval of the input digital signal ($D_{in}$) and supplied to the respective signal processing blocks 5, 6, and 7.

According to the present invention, the signal lines for inputting and outputting the input digital signal are used to input or output the operation control data, and the operation control data added to the blanking interval of the input digital signal are used to control the signal processing of the plurality of signal processing blocks. Hence, since the digital signal processing circuit according to the present invention can input or output the operation control data using the signal lines for inputting and outputting the input digital signal, many signal lines connected to the respective signal processing blocks through which the operation control data was inputted and outputted can be omitted and a great amount of data can be inputted and outputted at high speeds.

Next, specific examples of the arithmetic operation circuit 54 shown in FIG. 3 will be described below.

First, a gamma correction circuit will be described as one example of the arithmetic operation circuit 54 with reference to FIGS. 4, 5, 6, and 7.

Figure 4:
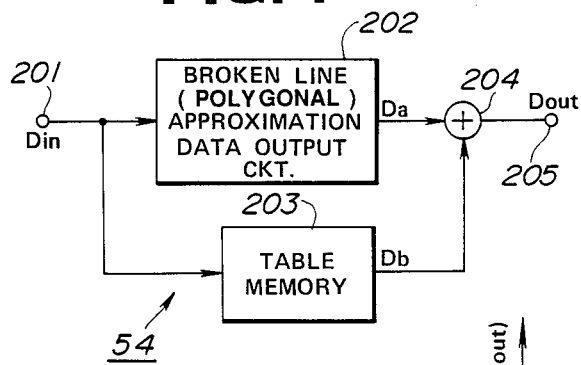
FIG. 4 is a simplifed block diagram of an example of an arithmetic operation circuit shown in FIG. 3.

FIG. 4 shows the block diagram of a gamma correction circuit as the representative arithmetic operation circuit 54.

The gamma correction circuit (arithmetic operation circuit) 54 comprises an approximation data output circuit 202 to which the input data ($D_{in}$) are supplied from the data input terminal 201, a look-up table memory 203 to which the input data ($D_{in}$) are supplied from the above-described data input terminal 201, and an adder 204 which adds the approximation data (Da) outputted from the approximation data output circuit 202 to the correction data (Db) outputted from the memory 203. The adder 204 supplies the added output data ($D_{out}$) to the data output terminal 205.

Figure 5:
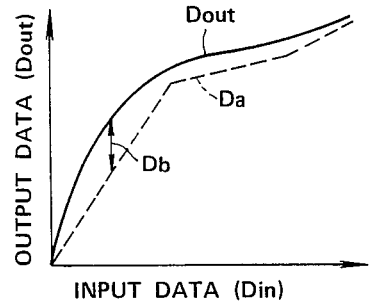
FIG. 5 is a characteristic graph for explaining an operation of the arithmetic operation circuit shown in FIG. 4.

The approximation data output circuit 202 outputs approximation data (Da) having the approximation characteristic shown in the broken line of FIG. 5 for which a broken line (polygonal) approximation is carried out for a non-linear conversion characteristic of the output data ($D_{out}$) of the arithmetic operation circuit 54. The output data ($D_{out}$) are shown in a solid line with respect to the input data ($D_{in}$) plotted along a horizontal axis of FIG. 5.

In addition, in the above-described look-up table memory 203, correction data (Db) expressed as (Db)=($D_{out}$)−(Da) are previously written into an address specified by the above-described input data ($D_{in}$). The correction data (Db) is, as explained above, a difference between the output data ($D_{out}$) of the digital signal processing block 5 and the approximation data (Da) with respect to the input data ($D_{in}$).

The correction data (Db), written in the address specified by the input data ($D_{in}$) supplied into an address line of the memory 203 are outputted on the data line. In addition, the adder 204 generates the output data ($D_{out}$), expressed by ($D_{out}$)=(Da)+(Db), by adding the approximation data (Da) outputted from the approximation data output circuit 202 to the correction data (Db).

In detail, the arithmetic circuit 54 carries out a predetermined non-linear processing by adding: (a) the approximation data (Da) having the approximation characteristic approximate to the non-linear conversion characteristic with respect to the input data ($D_{in}$) supplied to the data input terminal 201; and (b) the correction data (Db), indicative of the difference between the output data ($D_{out}$) having the non-linear conversion characteristic read from the table look-up table memory 203, and the approximation data (Da). The non-linear output data ($D_{out}$), i.e., the gamma corrected data are outputted via the output data output terminal 205.

Hence, the arithmetic operation circuit 54 can remarkably reduce the non-linear output data ($D_{out}$) as compared with the case where the non-linear output data ($D_{out}$) are all written in the memory 203 since the correction data (Db) written into the memory 203 are data indicative of the difference between the non-linear output data ($D_{out}$) and approximation data (Da). Consequently, the circuit scale can be reduced and the power consumption can also be reduced.

Figure 6:
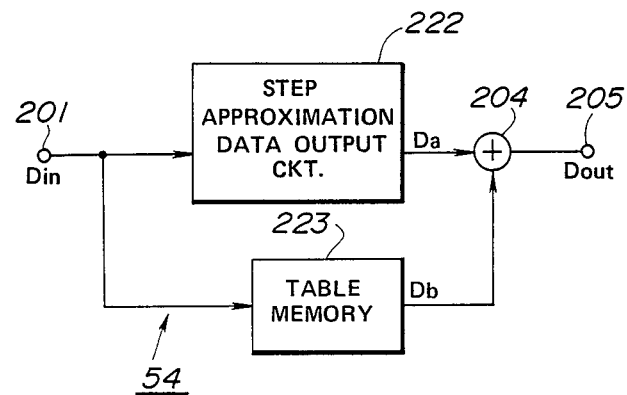
FIG. 6 is a simplified circuit block diagram of another example of the arithmetic operation circuit shown in FIG. 3.
Figure 7:
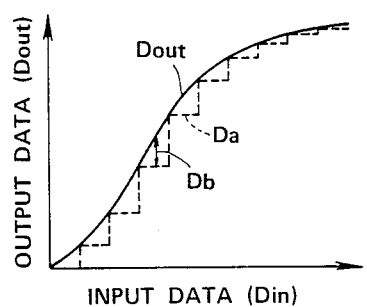
FIG. 7 is a characteristic graph for explaining the operation of the arithmetic operation circuit shown in FIG. 6.

FIG. 6 shows another approximation data output circuit 222 and the table look-up memory 223 in which the approximation data output circuit 222 outputs the approximation data (Da) indicated by a broken line in FIG. 7. A step approximation is carried out for the non-linear conversion characteristic of the output data ($D_{out}$), indicated by a solid line in FIG. 7 with respect to the input data ($D_{in}$) plotted along the horizontal axis shown in FIG. 7. The step approximation uses the table look-up memory 223 in the same way as the above-described memory 203. In this example, the correction data (Db), i.e., the data indicative of the difference between the output data (Dout), having the non-linear conversion characteristic with respect to the input data ($D_{in}$) and approximation data (Da) of the step approximation characteristic (expressed as follows: (Db)=($D_{out}$)−(Da)) are written into the address specified by the data ($D_{in}$). Therefore, the predetermined non-linear processing is carried out for the input data ($D_{in}$) supplied to the data input terminal 201 so that the non-linear output data ($D_{out}$) can be outputted from the data output terminal 205. It is noted that the other circuit cinstructions are the same as those in the above-described arithmetic operation circuit 54. The same reference numerals shown in FIGS. 4 and 6 designate corresponding elements and their detailed explanations are omitted here.

Examples of the gamma correction circuits are shown in FIGS. 4 and 6. In FIGS. 4 and 6, the control of the gamma characteristic is carried out by means of the control signal formed on the basis of the operation control data (CD), and the desired gamma characteristic is selected. Therefore, a plurality of table memories 203 in FIG. 4 or table memories 223 in FIG. 6 are prepared and a desired one the table memories is selected according to the control signal. Alternatively, the data in the memory table 203 or 223 may be transmitted as the control signal and these data may be written in the table memory 203 or 223 comprised of a RAM (Random Access Memory), so as to obtain the desired correction data (Db).

As another example of the arithmetic operation circuit 54, the construction of an aperture correction circuit, to which a level compensation circuit, such as a knee circuit is connected as the successive stage thereof will be described below with reference to FIG. 8.

Each digital input video signal of three primary colors R(Red), G(Green), and B(Blue) is supplied to the arithmetic operation circuit 54. The three primary color video signals correspond to the data input ($D_{in}$) of FIG. 3.

The video signal processing circuit in FIG. 8 includes the aperture correction circuit 310 for carrying out an aperture correction for each input video signal (R), (G), and (B) supplied to a corresponding input terminal 301R, 301G, and 301B, a level compression processing circuit 330 for carrying out level compression processing for each video signal for which the aperture correction is carried out in the aperture correction circuit 310 and for outputting the corrected video signal to each output terminal 302R, 302G, and 302B, and a control block 340 for variably controlling an aperture correction quantity derived by the above-described aperture correction circuit 310. A control signal, such that the level compression characteristic of the level compression processing circuit 330 is controlled according to the level of the input video signal. is supplied via a control input terminal 304 to the level compression processing circuit 330 and to the control block 340.

The aperture correction circuit 310 includes: (a) an aperture correction signal generation block 320 for producing the aperture correction signal from the input video signal (G) supplied to the input terminal 301G., (b) three delay circuits 311R, 311G, and 311B, for providing delay quantities corresponding to the processing durations during which the signals are processed in the aperture correction signal generation block 320, for the respective input video signals (R), (G) and (B) connected to the respective input terminals 301R, 301 G, and 301B; and (c) three adders 312R, 312G, and 312G for adding the aperture correction signal supplied from the aperture correction signal generating block 320 to each video signal supplied via the three delay circuits 311R, 311G, and 311B.

The aperture correction signal generating block 320 includes an aperture detection circuit 321 for detecting an aperture part of the input video signal (G) supplied to the input terminal 301G, a level adder 322 for generating a predetermined output signal according to the level of the input video signal (G) supplied to the input terminal 301G, a multiplier 323 for multiplying the output signal of the aperture detection circuit 321 by the output signal of the level adder 322, and a noise elimination circuit 324 for eliminating noise components from the output signal of the multiplier 323.

The aperture detection circuit 321 generates an output signal as equivalently shown in analog form in FIG. 9(b) upon detection of a rising edge and falling edge of a waveform indicative of the aperture part of the input video signal (G) equivalent shown in analog form in FIG. 9(a), received from the input terminal 301G.

The output signal of the aperture detection circuit 321 is supplied to the multiplier 323 and multiplied by the signal from the level adder 322, whose output is a function of the level of the input video signal (G) supplied to the input terminal 301G so that the output signal of the aperture detection circuit 321 is subjected to a so-called level-dependent processing and is formed in a signal waveform as equivalently shown in FIG. 9(c). Thereafter, the output signal described above is supplied to the noise elimination circuit 324. It is noted that the output signal of the above-described level adder 322 defines the aperture correction quantity of the aperture correction processing carried out for the respective input video signals (R), (G), and (B) in the aperture correction circuit 310 and is generated in the non-linear form according to the level of the input video signal (G) so as to carry out a favorable aperture correction processing. The noise elimination circuit 324 carries out a so-called crisping in which minute level signals included in the output signal of the multiplier 323 are eliminated as the noise components, and generates the aperture correction signal equivalently shown in FIG. 9(d).

Each adder 312R, 312G, and 312B in the aperture correction circuit 310 carries out the addition processing by adding the aperture correction signal supplied from the aperture correction signal generating block 320 respectively input video signal (R), (G), and (B) supplied via the corresponding delay circuits 311R, 311G, and 311B. The video signals thus subjected to the aperture correction supplied to the level compression processing circuit 330. That is to say, for example, in one of the adders 312G, the aperture correction signal supplied from the aperture correction signal generating block 320 is added to the input video signal (G) so that an overshooting or undershooting waveform which has placed emphasis on the aperture part is added to the rising edge or falling edge of the waveform of the input video signal. Thus, the aperture compensated video signal, as shown in FIG. 9(e), is produced.

It is noted that although delay times inherently generated during signal processings are not shown in the signal waveforms of FIGS. 9(a) to 9(e), each delay circuit 311R, 311G, and 311B in the aperture correction circuit 310 compensates for these delay time so that the time at which each input video signal (R), (G), and (B) appears at the adders 312R, 312G and 312B coincides with that at which the aperture correction signal appears.

The level compression processing circuit 330 carries out the level compression processing for each video signal (R), (G) and (B) which has been subjected to the aperture correction and has been supplied from the aperture correction circuit 310. The level compression circuits 331R, 331G, and 331B constitute the level compression processing circuit 330, each of which outputs the processed video signal to the corresponding output terminal 302R, 302G, and 302B. The control signal is supplied to the respective level compression circuits 331R, 331G, and 331B via the input terminal 304.

Each level compression circuit 331R, 331G, and 331B carries out a so-called knee correction by level-compression processing for a non-linear characteristic which is set selectively according to the control signal from a plurality of non-linear characteristics such as the level characteristics of the output signal, plotted along the vertical axis with respect to the level of the input signal, plotted along the horizontal axis, of FIG. 10.

It is noted that the level compression characteristic is used to change the level of the video signal and may describe a smoothly increasing curve or a concave-shaped secondary degree curve.

The control block 340 comprises a first control circuit 341 for controlling the level adder 322 and a second control circuit 342 for controlling the noise elimination circuit 324. These first and second control circuits 341, 342 receive the control signal via the input terminal 304.

The first control circuit 341 controls the input-and-output characteristic of the level adder 322 so that the output video signal does not provide an unnatural image through the level compression processing carried out through the level compression processing circuit 330. Control circuit 341 thus variably controls a quantity of the aperture correction provided in the aperture correction circuit 310 for each input video signal (R), (G), and (B).

In addition, the second control circuit 342 changes the noise elimination characteristic of the noise elimination circuit 324 so that the noise is not increased in the output video signal through the level compression processing carried out by means of the level compression processing circuit 330. Controls circuit 342 controls in such a way that the minute level signal components of the aperture signal are eliminated to a predetermined amount.

Accordingly, in the video signal processing apparatus of the above example the aperture correction quantity of the aperture correction circuit 310 is variably controlled, interlocking with the set characteristic of the level compression processing circuit 330. Therefore, a favorable aperture correction processing can be achieved together with the level compression processing according to the levels of the input video signals (R), (G), and (B).

It is noted that the level adder 322, noise elimination circuit 324, and each level compression circuit 331R, 331G, and 331B can non-linearly control each corresponding characteristic by controlling the write and read of data, e.g., in the look-up table constituted by the memory.

In the preferred embodiment described above, when the input video signal is supplied, the aperture correction circuit carries out the aperture correction processing for the input video signal, and the level compression processing circuit carries out the level compression processing for the video signal subjected to the aperture correction processing to generate the output video signal. Then, the control circuit variably controls the quantity of the aperture correction produced by the aperture correction circuit, interlocking with the set characteristic of the level compression processing circuit.

Consequently, since in the video signal processing apparatus according to the preferred embodiment described above, the quantity of the aperture correction added to the input video signal is variably controlled in association with the set characteristic of the level compression processing circuit, a favorable aperture correction processing can be carried out according to the level of the input video signal together with the level compression processing.

An example of a digital clip circuit which digitally carries out so-called white clip, dark clip, and related operations will be described below with reference to FIGS. 11 to 17 as a last example of the arithmetic operation circuit 54 shown in FIG. 3.

In FIG. 11, input data ($D_{in}$) are supplied via a data input terminal 402 to a digital clip circuit 401, and upper limit data (Dh) is supplied to the digital clip circuit 401 via an upper limit data input terminal 403. In addition, lower limit data (D1) are supplied to a level limit processing block 410 via a lower limit data input terminal 404.

The output data (D1) of the level limit processing block 410 are supplied to a delay correction processing block 420, a low-pass filter (LPF) data processing block and a filter characteristic approximation processing block 440. The output data (D4) of the filter characteristic approximation processing block 440 are supplied to the level detection processing block 450, together with the upper limit data (Dh) which are supplied via the upper limit data input terminal 403 and the lower limit data (DL)) which are supplied via the lower limit data input terminal 404. A synthesizing processing block 460 receives the output data (D2) of the delay correction processing block 420, the output data (D3) of the LPF data processing block 430, and the output data (D5) of the level detection processing block 450. Output data (Dout) of the synthesizing processing block 460 are supplied to a data output terminal 405.

Series-connected circuits comprising a digital-to-analog (D/A) converter 406 and an interpolation filter 407 are connected to the data output terminal 405 of the digital clip circuit 401 directly or via another digital signal processing circuit. Output data ($D_{out}$) supplied to the data output terminal are converted by means of the digital-to-analog converter 406 and interpolation filter 407 and are supplied to the analog signal output terminal 408.

The construction of each block constituting the digital clip circuit 401 will be described below with reference to FIGS. 13 to 17. A specific signal processing will also be described with reference to a waveform chart, shown in FIG. 12 equivalently showing data at various parts in the digital clip circuit 401 in an analog form.

The level limit processing block 410 is shown in FIG. 13. It comprises first and second switching circuits 412, 413 connected in series between the data input terminal 402 and data output terminal 411 and first and second comparators 414, 415 outputting a control signal for switching the switching circuits 412, 413, respectively.

The first comparator 414 has one input terminal connected to the data input terminal 402, the other input terminal connected to the upper limit input terminal 403, and its output terminal connected to a control input terminal of the first switching circuit 412. The second comparator 415 has one input terminal connected to the data input terminal 402, the other input terminal connected to the lower limit data input terminal 404, and its output terminal connected to a control input end of the second switching circuit 413.

The first switching circuit 412 has an output terminal switched between the data input terminal 402 and upper limit data input terminal 403.

The second switching circuit 413 is switched to connect either the output terminal of the first switching circuit 412 on the lower limit data input terminal 404 to the data output terminal 411.

The output signal from the first comparator 414 controls the state of the first switching circuit 412 as follows. The first comparator 414 connects the data input terminal 402 to the second switching circuit 413 when the level of the input data ($D_{in}$) supplied from the data input terminal 402 is smaller than the level of the upper limit data (Dh) from the upper limit data input terminal 403. When the input data ($D_{in}$) is larger than the level of the upper limit data ($D_h$), the above-described upper limit data input terminal 403 and second switching circuit 413 are connected. The output signal from the second comparator 415 controls the switching connection of the second switching circuit 413 as follows. The second comparator 415 connects the first switching circuit 412 to the data output terminal 411 when the level of the input data ($D_{in}$) is larger than the level of the lower limit data (D1) supplied from the lower limit data input terminal 404. When the input level of the data ($D_{in}$) is smaller than the level of the lower limit data (DL), the second comparator 415 connects the lower limit data input terminal 404 to the data output terminal 411.

Hence, the level limit processing block 410 connects the data input terminal 402 and data output terminal 411 via the first and second switching circuits 412, 413 so that the input data ($D_{in}$) are directly outputted from the data output terminal 411 if the level of the input data ($D_{in}$) supplied via the data input terminal 402 is between the level of the upper limit data ($D_h$) and lower limit data (DL). In addition, when the level of the input data ($D_{in}$) is above the level of the upper limit data ($D_h$), the first switching circuit 412 connects the upper limit data input terminal 403 to the input end of the second switching circuit 413. The upper limit data ($D_h$) are outputted from the data output terminal 411 via the second switching circuit 413. Furthermore, if the level of the input data ($D_{in}$) is lower than the lower limit data (D1), the second switching circuit 413 connects the lower limit data input terminal 404 to the data output terminal 411 so that the lower limit data (D1) are outputted via the data output terminal 411.

In other words, the level limit processing block 410 carries out the level limit processing (so-called clip ) so as to replace the data whose signal level is larger than the magnitude of the upper limit data ($D_h$) with the upper limit data ($D_h$) and replace the data whose signal level is smaller than the magnitude of the lower limit data (D1) with the lower limit data (D1).

For example, when in the level limit processing block 410 the data signal input terminal 402 receives the input data ($D_{in}$) shown in FIG. 12(a), the digital clip circuit 401 carries out the level limit processing (so-called clip operation) according to the upper limit level indicated by the upper limit data ($D_h$) supplied to the upper limit data input terminal 403 and the lower limit level indicated by the lower limit data (D1) supplied to the lower limit data input terminal 404. Thus, the level limit processing block 410 generates the data (D1) shown in FIG. 12(b).

The data (D1) outputted from the data output terminal 411 of the level limit processing block 410 are supplied to a delay correction processing block 420, a low-pass filter (LPF) data processing block 430, and a filter characteristic approximation processing block 440.

The delay correction processing block 420 includes a delay circuit 422, as shown in FIG. 14. Data (D2) are generated, as shown in FIG. 12(c), which provide a delay corresponding to one clock for the data (D1) supplied to the data input terminal 421. The delay data (D2) are supplied to the data output terminal 423.

The reason for the generation of the delay data (D2) which are delayed by one clock with respect to the data (D1) supplied to the data input terminal 421 is to synchronize the data (D2) to be processed in the synthesizing processing block 460 with the timing of the data (D3) and data (D5).

The data (D2) are converted into an analog signal via the digital-to-analog converter 406 and are converted into an analog output signal ($S_{out}$) through the interpolation filter 407. At this point, an overshooting occurs on the rising edge of the analog signal waveform, as in previously proposed digital clip circuits so that the output waveform to exceeds the upper limit level of the upper limit data (Dh).

The LPF data processing block 430, shown in FIG. 15, includes two delay circuits 432, 433 adder 434, ½ multiplier 435, adder 436, and ½ multiplier 437. These circuits are connected in series between the data input terminal 431 and the data output terminal 438. The delay circuits 432, 433 are circuits for delaying the data supplied to the corresponding input terminal by one clock in the same way as delay circuit 422 described above. The adder 434 adds the data outputted from the delay circuit 433 to the data (D1), supplied from the level limit processing block 410 to the data input terminal 431. In addition, the subsequent adder 436 adds the data derived from the ½ multiplier 435 to the data derived from the delay circuit 432. The ½ multipliers 435, 437 output data having a magnitude of ½ that the data supplied thereto.

The LPF data processing block 430 generates data (D3). For example, suppose that the data outputted from the delay circuit 432 denote a basic data $Z^0 = 1$, the data supplied to the data input terminal 431 from the level limit processing block 410 denote a data $Z^{-1}$ preceded by one clock, and the data outputted from delay circuit 433 are the data $Z^{+1}$ delayed by one clock. Then, a low-pass filter characteristic (F(1)) expressed as follows—$F(1) = (Z^{-1} + 2 + Z^{+1})/4$—Equation 1—is used to process the data (D1) supplied data input terminal 431 from the level limit processing block 410. The LPF data processing block 430 supplies the above-described data (D3) from the data output terminal 438 to the synthesizing processing block 460.

The LPF data processing block 430 supplies the data (D3) from the data output terminal 438 to the above-described synthesizing processing block 460.

Accordingly, when the LPF data processing block 430 receives the data (D1) shown in FIG. 12(b) at its data input terminal 431, the data (D3) are generated such that the rate of change in the data is gradual and the one-clock delay is provided, as shown in FIG. 12(d).

The filter characteristic approximation processing block 440, shown in FIG. 16, includes two delay circuits 442, 443 installed between the data input terminal 441 and data output terminal 447, an adder 444, 1/16 multiplier 445, and a subtraction circuit 446. These circuits are connected in series and 18/16 multiplier 448 multiplys by 18/16 the data outputted from the delay circuit 442 and supplies the 18/16 multiplied data to the subtraction circuit 446.

The delay circuits 442, 443 for delay and output the data supplied to their data input terminals by one clock in the same way as described for delay circuit 422, 432, 433. The adder 444 generates the data (D4). That is to say, the adder 444 the data supplied from the delay circuit 443 and data (D1) supplied from the level limit processing block 410 to the data input terminal 441. Also the 1/16 multiplier outputs data having a magnitude 1/16 of that of the data supplied from the adder 444. Finally, the subtraction circuit 446 subtracts the data supplied from the 18/16 multiplier 448 from the data supplied from the 1/16 multiplier 445.

Suppose that in the filter characteristic approximation processing block 440, the data outputted from the delay circuit 442 are a basic data $Z^0=1$ the data (D1) supplied from the level limit processing block 410 to the data input terminal 441 are data $Z^{-1}$ preceded by one clock, and the data outputted from the delay circuit 442 are data $Z^{+1}$ delayed by one clock.

The filter characteristic of the interpolation filter 407 is approximated using the characteristic (F(2)) shown in the following equation 2.

$$F(2)=(-Z^{-1}+18-Z^{+1})/16 \qquad \text{Equation 2.}$$

The filter approximation characteristic (F(2)) is provided for the data (D1) supplied to the data input terminal 441 from the level limit processing block 410. The filter characteristic approximation processing block 440 supplies the data (D4) from the data output terminal 447 to the level detection processing block 450.

Accordingly, in the filter characteristic approximation processing block 440, the data (D4) shown in FIG. 12(e) are outputted from the data output terminal 447 when the data (DL) shown in FIG. 12(b) are supplied. The data (D4) indicate an approximation data, predicting a signal level of the analog output signal waveform in cases where the data (D2) are directly converted into an analog output signal via the digital-to-analog (D/A) converter 406 and interpolation filter 407.

The level detection processing block 450, shown in FIG. 17, includes a subtraction circuit 452, for subtracting the upper limit data (Dh) supplied to the upper limit data input terminal 403, from the data (D4) supplied to the data input terminal 451 from the filter characteristic approximation processing block 440. It further includes a switching circuit 453 having one input terminal for receiving the output data (D+) of the subtraction circuit 452, a second input terminal for receiving the basic data [0], and an output terminal connected to an adder 454 switching circuit 453 has a control input terminal for receiving the control signal outputted from the output terminal of a comparator 456. The comparator 456 has one input terminal for receiving the output data (D+) of the subtraction circuit 452 and a second input terminal for receiving the basic data [0], whereby comparator 456 controls the switching operation of the switching circuit 453. In addition, the subtraction circuit 457 subtracts the data (D4) supplied to the data input terminal 451 from the lower limit data (DL) supplied to the lower limit data input terminal 404. The output data (D−) is supplied to one input terminal of a switching circuit 458. The other input terminal of the switching circuit 458 receives the basic data [0], and the output terminal thereof is connected to the adder 454. The switching operation of the switching circuit 458 is controlled by means of the control signal outputted from the output terminal of the comparator 459. The comparator 459 has one input terminal receiving the output data (D−) and the other input terminal receiving the basic data [0]. The adder 454 adds the data supplied from the output terminal of each switching circuit 454, 458 to generate the data (D5). The data (D5) are supplied to the data output terminal 455.

The comparator 456 compares the data (D+) outputted from the subtraction circuit 452 with the basic data [0]. The data (D+) are the data (D4) supplied to the data input terminal 451 minus the upper limit data (Dn). When the magnitude of the data (D+) is larger than the basic data [0], the switching circuit 453 is controlled so that the subtraction circuit 452 is connected to the adder 454.

In addition, the comparator 456 controls the switching circuit 453 so that the basic data [0] are supplied to the adder 454 when the magnitude of the data (D+) is smaller than the basic data [0].

The comparator 459 compares the data (D−) with the basic data [0]. The data (D−) are the data (D4) supplied from the filter characteristic approximation processing block 440 to the data input terminal 451, minus the lower limit data (DL), i.e., the output data of the subtraction circuit 457. When the magnitude of the data (D−) is larger than the basic data [0], the switching circuit 458 is controlled so that the circuit 457 is connected to the adder 454. When the magnitude of the data (D−) is smaller than the basic data [0], the switching circuit 458 is controlled so that the basic data [0] are supplied to the adder 454. The data outputted from the switching circuits 453, 458 are added by means of the adder 454 and supplied to the data output terminal 455.

Thus, the level detection processing block 450 outputs the basic data [0] from the data output terminal 455 when the data (D4) supplied from the filter characteristic approximation processing block 440 to the data input terminal 451 have a value intermediate between the upper limit data (Dh) and lower limit data (D1). When the data (D4) have a value not between the upper and low limit data (Dh, D1), a data (D5), indicating a quantity by which the data level exceeds either of the data levels (level-over quantity), are outputted from the output terminal 455. Hence, the above-described level detection processing block 450 generates the data (D5) indicated in FIG. 12(f) corresponding to the level-over, quantity of the data below the lower limit data (D1) or above the upper limit data (Dh). The data (D5) are supplied from the output data output terminal 455 to the synthesizing processing block 460.

The synthesizing processing block 460 receives the data (D2), (D3), and (D5) and includes (as shown in FIG. 11) three multipliers 461, 463, 464, a subtraction circuit 462, and the adder 465. The multiplier circuit 461 outputs the data (D6) are a multiplication of the data (D5), supplied from the level detection processing block 450, multiplied by a predetermined constant [A]. The subtraction circuit 462 outputs the data (D7) which are the basic data [1] minus the data (D6). The multiplication circuit 463 outputs the data (D8) which are the data (D7), outputted from the subtraction circuit 462, multiplied by the data (D2) supplied from the delay correction processing block 420. The multiplier 464 outputs the data (D9) which are a multiplication of the data (D6), outputted from the multiplier 461, and data (D3) outputted from the LPF data processing block 430.

The adder 465 provides the data (Dout), an addition of the data (D9), outputted from the multiplier 464, and the data (D8) outputted from the multiplier 463, to the data output terminal 405.

Therefore the above-described synthesizing processing block 460 provides the characteristic (F(3)) shown in an equation 3 for the data (D2), supplied from the delay correction circuit 420, to generate the output data (Dout) at the data output terminal 405.

The equation 3 is expressed as follows:

$$F(3) = \text{alpha} \{ \tfrac{1}{2} + (Z^{-1} + Z^{+1})/4 \} + (1 - \text{alpha})$$
$$= 1 + \{(Z^{-1} + Z^{+1})/4 - \tfrac{1}{2}\} \text{ alpha}$$

Equation 3

In the equation 3, alpha denotes a value of the data (D5) outputted from the level detection processing block 450 and multiplied by the constant [A] of the multiplier 461.

In other words, in the synthesizing processing block 460, the multiplier 464 generates the correction data (D9) which are a multiplication of the data (D6) and by the data (D3) supplied from the LPF data processing block 430 for which the low-pass filter characteristic is provided. The data (D6), moreover, are changed according to the data (D5) outputted from the level detection processing block 450.

Then, in the synthesizing, processing block 460, the adder 465 adds the correction data (D9) to the data (D2) supplied from the level limit processing block 410 via the delay correction processing block 420 for which the level limit is provided and the added data are outputted as the output data ($D_{out}$).

Hence, when data (D2), indicated in FIG. 12(c), data (D3), indicated in FIG. 12(d), and data (D5), indicated in FIG. 12 (f) are supplied to the synthesizing processing block 460, the multiplier 461 generates data (D6), shown in FIG. 12(g), by multiplying the data (D5), supplied to the level detection processing block 450 by the predetermined constant [A]. The data (D6) are supplied to the subtraction circuit 462 and multiplier 464. The data (D6) corresponds to a variable [alpha] indicated in the equation 3 and are varied according to the value of the data (D5).

The subtraction circuit 462 generates data (D7), shown in FIG. 12(h), by subtracting the data (D6) from the basic data [1] and supplies the data (D7) to the multiplier 463. The multiplier 463 generates data (D8), shown in FIG. 12(i), by multiplying the data (D2), supplied from the delay correction processing block 420, by the data (D7) and supplies the data (D8) to the adder 465. The multiplier 464 generates the data (D9), shown in FIG. 12(j), by multiplying the data (D6), supplied from the multiplier 461, by the data (D3), supplied from the LPF data processing block 430, and supplies the data (D9) to the adder 465. The adder 465 generates the output data (Dout), shown in FIG. 12(k), by adding the data (D8) to the data (D9) and supplies the data (Dout) to the output terminal 405.

In this case, the output data (Dout) are such that the change rate of the parts of the data (D2) corresponding to the upper limit data ($D_h$) and lower limit data (D1) are slightly reduced according to an overshooting quantity generated when the data (D2) are converted into the analog form and are passed through the interpolation filter 407.

The output data (Dout) derived from the data output terminal 405 of the digital clip circuit 401 are converted into the analog output signal (Sout), shown in FIG. 12(i) by means of the digital-to-analog (D/A) converter 406 and interpolation filter 407 and are outputted via the signal output terminal 408, as shown in FIG. 11.

The analog output signal ($S_{out}$) has a waveform approximately equal to that shown in FIG. 12(l) in the analog signal form, and the overshooting causes the analog output signal ($S_{out}$) not to exceed the upper limit level of the upper limit data (Dh).

In the way described above, the digital clip circuit 401 in the example shown in FIG. 11 generates the output data (Dout) by adding the correction data (D9) to the data (D2) in a case when the overshooting occurs during the passage of the analog data (D2) through the interpolation filter 407. The data (D2) are generated by carrying out the level limit processing for the input data ($D_{in}$) through the level limit processing block 410. Thus, in the case where the input data ($D_{in}$) forms of the analog signal and are passed through the interpolation filter 407, the output data ($D_{out}$) can be generated so as to be converted into a favorable analog signal (Sout) without occurrence of overshooting.

The same processing is carried out for an undershooting generated on a falling edge of a waveform of the analog output signal (Sout) in the digital clip circuit 401, although the explanation thereof is omitted here.

If the digital clip circuit 401 is used as the arithmetic operation circuit 54 shown in FIG. 3, the upper limit data (Dh) and lower limit data (D1) can be controlled in response to the control signal derived from the control circuit 55.

What is claimed is:

1. A digital signal processing circuit used in a video camera for processing a digital video signal having an effective signal interval and a blanking interval in a repeated fashion, said digital signal processing circuit comprising:
   an input terminal for receiving the digital video signal;
   control data generating means for generating control data with a block address;
   control data inserting means for inserting said control data with the block address into the blanking interval of said digital video signal; and
   a plurality of signal processing circuit blocks connected in series with each other,
   each of said signal processing circuit blocks processing the effective signal interval of the digital video signal in accordance with the control data having the block address designating that block and each of said signal processing blocks including control data separating means for separating the control data having the block address designating that block.

2. a digital signal processing circuit according to claim 1, wherein each of said signal processing circuit blocks further includes an operating circuit supplied with the digital video signal and for processing the effective signal interval of the digital video signal in accordance with the control data and for supplying the processed signal to the following block.

3. A digital signal processing circuit according to claim 2, wherein each of said processing circuit blocks includes a control circuit for decoding the block address and for controlling said separating means such that the control data having the block address designating that block are separated and the control data having the block address designating another block are supplied to the following block.

4. A digital signal processing circuit according to claim 2, wherein said operating circuit of one of said signal processing blocks includes a gamma correction circuit for controlling input-output characteristics of the digital video signal and said control data control the input-output characteristics.

5. A digital signal processing circuit according to claim 4, wherein said gamma correction circuit includes a polygonal approximation data generating means, a correcting data table having data corresponding to the difference between the polygonal approximation data and desired data and adder means for adding the polygonal approximation data and the output data of said correcting data table, and said control data controls the output data of said correcting data table.

6. A digital signal processing circuit according to claim 4, wherein said gamma correction circuit includes a step approximation data generating means, a correcting data table having data corresponding to the difference between the step approximation data and desired data and adder means for adding the step approximation data and the output data of said correcting data table, and said control data controls the output data of said correcting data table.

7. A digital signal processing circuit according to claim 2, wherein said operating circuit of one of said signal processing blocks includes an aperture correction for producing an aperture correction signal from the digital video signal, adder means for adding the aperture correction signal to said digital video signal, a level compression circuit supplied with the output of said aperture correction circuit, and said control data controls the level of said aperture correction signal and the characteristics of said level compression circuit.

8. A digital signal processing circuit according to claim 2, wherein said operating circuit of one of said signal processing circuit blocks includes a white clip circuit and a dark clip circuit, and said control data controls the white clip level and the dark clip level.

* * * * *